United States Patent [19]

Huffman

[11] 4,332,404
[45] Jun. 1, 1982

[54] FLEXIBLE TUBING COUPLING
[75] Inventor: John Huffman, Chatsworth, Calif.
[73] Assignee: Metal Bellows Corporation, Sharon, Mass.
[21] Appl. No.: 181,815
[22] Filed: Aug. 27, 1980
[51] Int. Cl.³ ............................................. F16L 27/00
[52] U.S. Cl. .................................... 285/223; 285/227; 285/328; 285/336; 285/373; 339/15
[58] Field of Search ............... 285/223, 227, 228, 226, 285/233, 234, 373, 419; 339/15, 117 R

[56] References Cited

U.S. PATENT DOCUMENTS

| | | | |
|---|---|---|---|
| 2,437,385 | 3/1948 | Halford | 285/227 X |
| 2,713,503 | 7/1955 | Ekholm | 285/226 X |
| 3,019,037 | 1/1962 | Caldwell | 285/226 |
| 3,038,553 | 6/1962 | Peters | 285/223 X |
| 3,186,739 | 6/1965 | Mahoff et al. | 285/231 |
| 3,495,853 | 2/1970 | Furrer | 285/373 X |
| 3,625,552 | 12/1971 | Mahoff | 285/336 |
| 3,753,205 | 8/1973 | Tuger | 339/15 |
| 3,891,291 | 6/1975 | Nadsady et al. | 339/15 |
| 3,958,649 | 5/1976 | Bull et al. | 285/223 X |

FOREIGN PATENT DOCUMENTS 1475678  3/1969  Fed. Rep. of Germany ...... 285/373

Primary Examiner—Thomas F. Callaghan
Attorney, Agent, or Firm—Cesari and McKenna

[57] ABSTRACT

A flexible tubing coupling employs ferrules at the tubing ends, each ferrule being connected to an annular end fitting by way of a bellows. The end fittings are statically secured together by retainer halves encircling the end fittings and captured there by a rigid ring. Engagement between ferrule rims and inner spherical surfaces on the retainer halves prevent undue extension and deflection of the bellows while maintaining a uniform stress distribution on the coupling components. Various end fitting static seal configurations are also disclosed.

13 Claims, 7 Drawing Figures

FLEXIBLE TUBING COUPLING

BACKGROUND OF THE INVENTION

This invention relates to a flexible coupling for connecting lengths of tubing. It relates more particularly to a coupling of this type which maintains a fluid-tight seal between the tubing lengths yet permits a certain degree of relative motion between those lengths.

The tubing with which we are concerned here is often used to convey fluids at relatively high pressure and/or at relatively high or low temperatures. Also the tubing is employed in applications in which the tubing is stressed, i.e. in an airplane wing for example. Accordingly, when connecting together lengths of tubing it is imperative that a coupling be employed which is able to permit relative sliding motion between the tubing lengths to prevent stress from developing or increasing, while at the same time providing an effective fluid-tight seal at the joint.

There exist various types of tubing couplings which are intended to accomplish that. Some such couplings are disclosed in U.S. Pat. Nos. 3,186,739, 3,753,205 and 3,891,291. However, they all suffer one or more drawbacks which tend to limit their use and application. Some do not flex sufficiently. Some have an excessive number of critical parts leading to reliability and tolerance accumulation problems. In other words, failure of a single, critical, small component in the coupling can cause total failure of the coupling. Bearing in mind that a coupled tubing may carry a toxic fluid or a fluid under high pressure or at high temperature, it is apparent that failure of the coupling can cause property damage and injury to persons in the vicinity of a tubing.

Also when some existing couplings are pressure-loaded with an angular misalignment of the joined-together tubing, the load is concentrated at a particular point or points within the coupling. This causes excessively high stresses on certain components of the coupling which tend to deform those components. Such deformities can cause fluid leakage past the seals between the coupling and the tubing. This is particularly so in the case of couplings employing resilient dynamic O-ring seals to maintain the fluid-tight integrity of the coupling. That problem is exacerbated for that type prior coupling if the seal has dried out with age or is maintained at a relatively high or low temperature for any appreciable length of time. Indeed such couplings cannot operate at all at temperatures too high for elastomeric seals.

SUMMARY OF THE INVENTION

Accordingly it is an object of the present invention to provide an improved flexible tubing coupling. Another object of the invention is to provide a tubing coupling composed of relatively few different parts.

A further object of the invention is to provide a coupling of this type which provides an unusual amount of flexibility between joined together tubing.

Still another object of the invention is to provide a coupling which does not suffer stress concentrations under load.

A further object of the invention is to provide a flexible tubing coupling which does not rely on small critical parts for its integrity.

A further object of the invention is to provide a fluid-tight flexible tubing coupling which can withstand relatively high temperatures and pressures without leakage.

A further object of the invention is to provide a flexible tubing coupling which has no dynamic seals.

A further object is to provide a tubing coupling that provides electrical bonding between the joined together tubing sections.

Other objects will in part be obvious and will in part appear hereinafter.

The invention accordingly comprises the features of construction, combination of elements and arrangement of parts as will be exemplified in the following detailed description, and the scope of the invention will be indicated in the claims.

In general, my flexible coupling includes ferrules for positioning at the ends of the tubing to be joined. Secured to each ferrule in axial alignment is one end of a flexible metal bellows and secured to the other end of each bellows is a rigid annular end fitting. The end faces of each end fitting are arranged and adapted so that, when the end fittings are brought together in axial alignment, their end faces cooperate to comprise a static fluid-tight seal all around the end fittings. The end fittings also have radially outwardly extending flanges whose proximate faces fit flush against one another.

The retainer assembly which actually locks the end fittings together comprises a pair of identical retainer halves whose ends fit together to form a ring around the end fittings. Each retainer half has a circumferential groove formed in its inner surface midway between its side edges. Furthermore, the sidewalls of the grooves are tapered so that, when the retainer halves encircle the end fittings, the end fitting flanges are wedgingly received into the grooves in the retainer halves.

The remaining component of the retainer assembly is a strong rigid ring which slideably engages over the retainer halves and presses them together while wedging them against the end fittings. That wedging action imparts axial compressive forces to the end fittings which force them into sealing engagement. The ring is removably retained in a centered position on the retainer halves by circular spring wires recessed into circumferential grooves formed in the inside surface of the ring. When the ring is in its centered position on the retainer halves, the spring wires snap into axially spaced-apart circumferential grooves formed in the outside surfaces of the retainer halves. Thus these spring wires retain the ring in its centered position in the event that the coupling is subjected to severe vibration. Yet the spring wires do not have to withstand any stresses due to loads applied to the coupling. Consequently, the failure of a spring does not affect the integrity of the coupling.

The opposing faces of the coupling end fittings which cooperate to provide the static seal can assume a variety of configurations depending upon the particular application. In one embodiment, the opposing faces each contain one-half of an O-ring gland so that when those faces are flush together they form a circumferential groove for containing a standard O-ring seal. Since the two end fittings are clamped together and do not move relative to one another as the joined-together tubing sections move relative to one another, the seal is a static seal which is not subjected to any distortion caused by such relative movement.

For high temperature applications, the opposing faces of the end fittings are configured with portions that cooperate with each other or with a flexible resilient metallic seal so that, when the two end fittings are wedged axially together by the retainer halves, a static fluid-tight seal exists between the end fittings. Also if desired electrical bonding between the joined together tubing may be assured simply by coating or plating the inside surfaces of the wedge-shaped grooves in the retainer halves with an electrically conductive material or by using a conductive material for the retainer.

In a preferred coupling embodiment, to protect the bellows from over-extension, the ferrules are constrained by the retainer halves to prevent excessive extension and deflection of the coupling. In this, the ferrules are formed with radially outward flanges having rounded rims. Also the inside surfaces of the retainer halves near their side edges where the retainer halves overlie the ferrules are formed with a spherical radius. The spherical surfaces and the ferrule flanges cooperate to limit the axial extension of the ferrules while providing uniform support all around the periphery of the ferrule with any reasonable misalignment of the joined-together tubing. In other words, each ferrule flange and the cooperating spherical surfaces are such that if the ferrule becomes cocked in any angular direction relative to the surfaces due to misalignment of the tubing sections, the ferrule flange and surfaces remain in contact all around the perimeter of the ferrule so that stresses due to such misalignment are distributed all around the coupling rather than being concentrated at one or more specific points of contact between the ferrule and the retainer halves.

While comprising a relatively few different parts, the present coupling provides superior sealing engagement between lengths of tubing. The coupling tolerates substantial relative motion between the joined-together tubing including bending and compression and extension motions while maintaining its fluid-tight integrity even under relatively high and relatively low temperature conditions.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
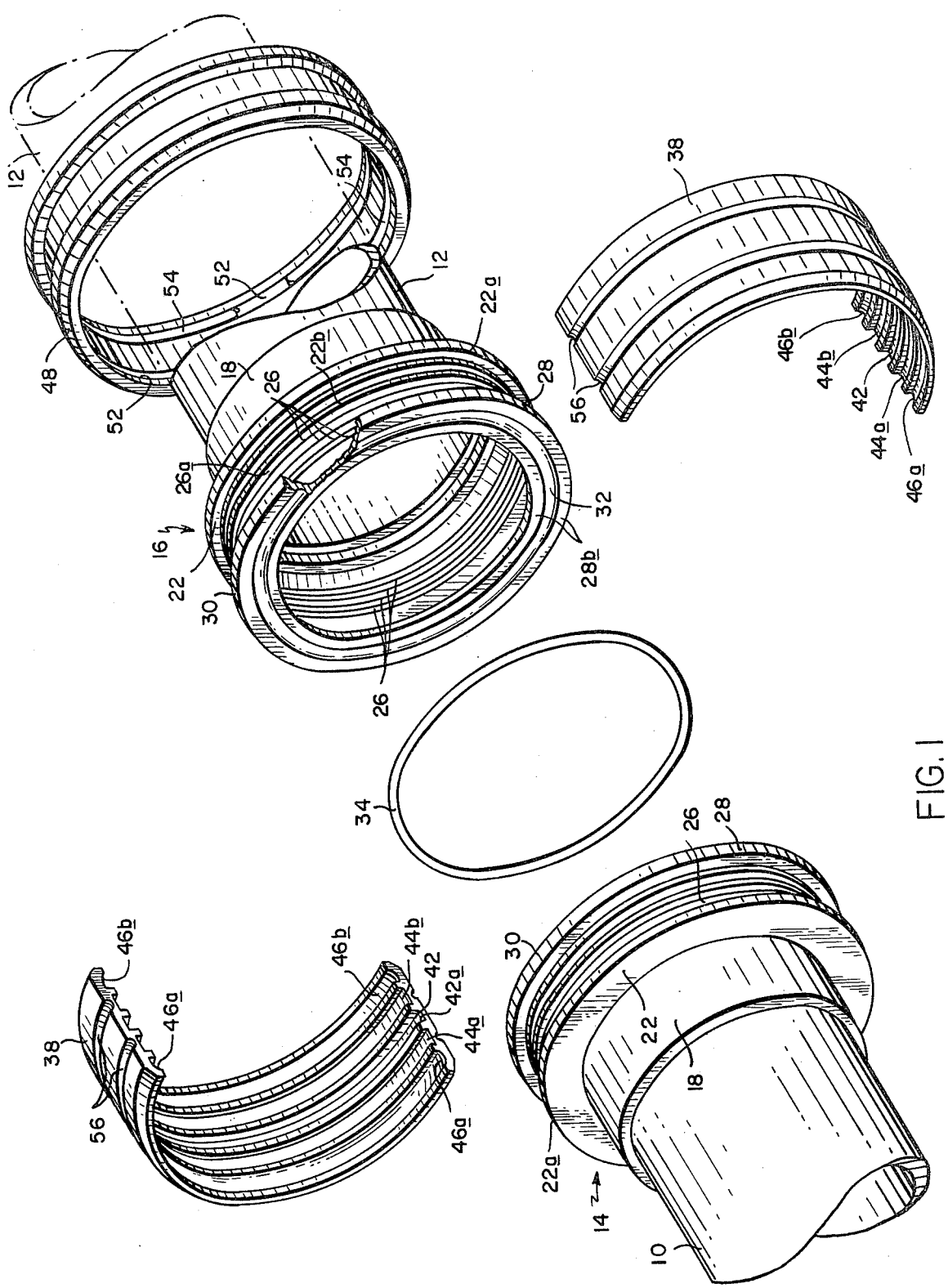
FIG. 1 is an exploded perspective view of a flexible tubing coupling embodying the principles of this invention.
Figure 2:
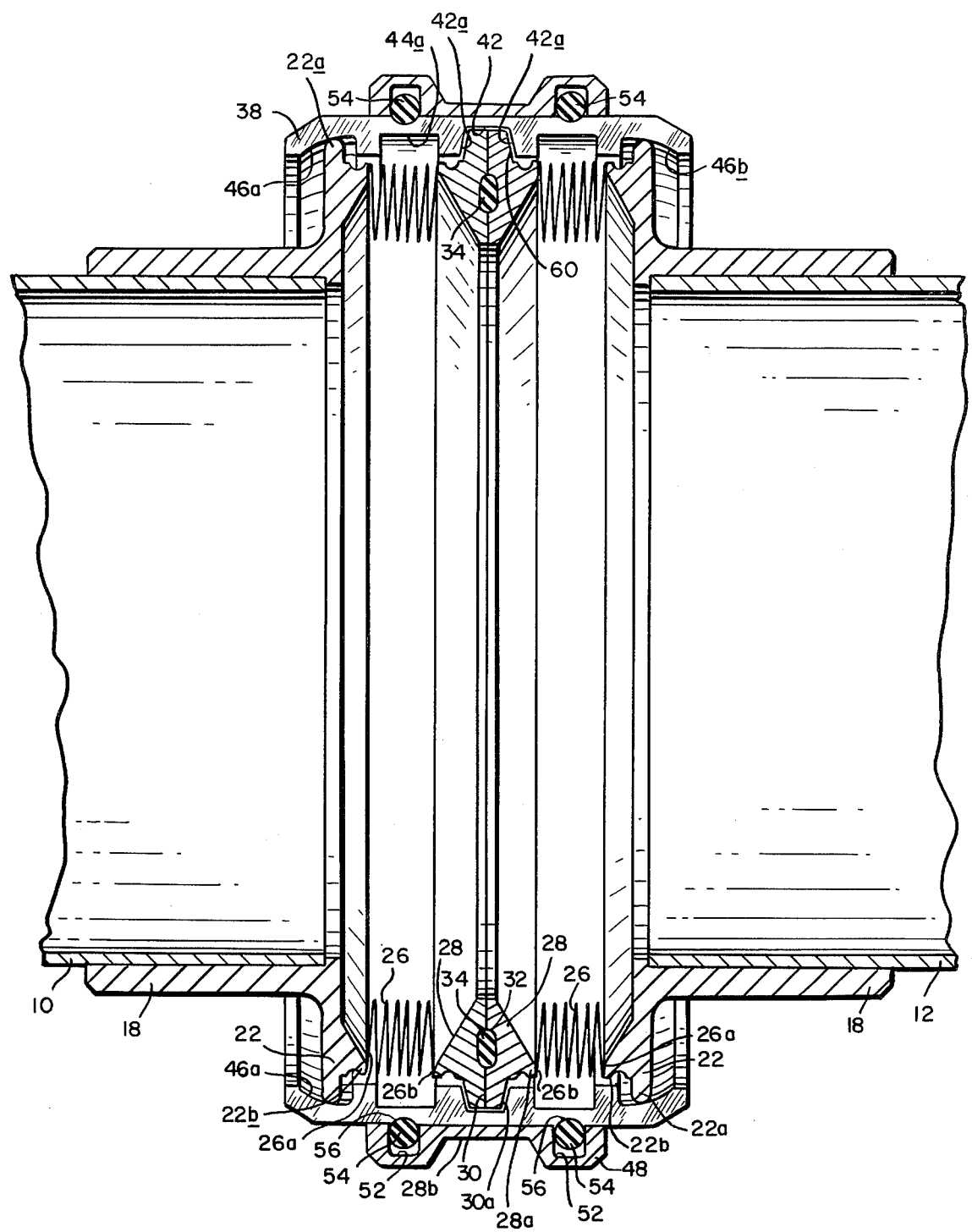
FIG. 2 is a view in medial section with a part in elevation showing the FIG. 1 coupling as installed.

Referring to FIG. 1 of the drawings, the tubing 10 and 12 to be joined are provided at their opposing ends with a pair of identical coupling sections shown generally at 14 and 16. Each coupling section includes a ferrule 18 engaged over the end of the tubing and welded, brazed or otherwise secured to the tubing. Each ferrule 18 has a radially outward extending flange 22 at its end, with the flange rim 22a being rounded as best seen in FIG. 2. Projecting axially from flange 22 is a circumferential lip 22b to which is suitably secured by brazing or welding one end of a bellows 26. The bellows is preferably constructed of stainless steel or other such heat and oxidation resistant material.

Still referring to FIGS. 1 and 2, each coupling section 14 and 16 also includes an annular end fitting 28. Each fitting 28 has an axially projecting circumferential lip 28a which is welded, brazed or otherwise secured to the opposite end 26b of the corresponding bellows 26. Each end fitting 28 is also formed with a circumferential flange 30 that extends radially outward beyond bellows 26 and also slightly beyond the ferrule flange 22. The flange sidewall 30a proximate to bellows 26 is axially tapered toward its rim as best seen in FIG. 2 for reasons that will become apparent later. On the other hand, each end fitting 28 has its end face 28b distal from the attached bellows 26 (including the adjacent flange 30 sidewall) formed flat except for a circular groove 32 extending around that surface. Each groove 32 forms one-half of an O-ring gland so that, when the fittings 28 of the two coupling sections 14 and 16 are placed flush against one another as shown in FIG. 2, the two grooves 34 cooperate to provide a circumferential passage in which is seated an O-ring 34.

Still referring to FIGS. 1 and 2, the tubing coupling also includes a retainer assembly composed of a pair of identical retainer halves 38 which are arranged to engage around the two flush-together end fittings 28. Formed on the inside surface of each retainer half 38 midway between its side edges is a semi-circular groove 42 whose opposite sidewalls 42a are tapered at the same angle as the two end fitting flange sidewalls 30a.

Spaced from groove 42 on opposite sides thereof are a pair of similar grooves 44a and 44b which are provided to reduce the weights of the retainer halves. The inner surfaces 46a and 46b of each retainer half 38 between grooves 44a and 44b and the corresponding side edges of the retainer half are formed with a cross-section that is spherical. In other words, as best seen in FIG. 2, the surfaces 46a and 46b of each retainer half consist of a sector of a spherical shell. The diameter of each spherical surface is slightly greater than the diameter of the associated ferrule flange 22 so that, when the retainer halves 38 are engaged around the coupling sections 14 and 16, those surfaces engage the flange rims 22a all around the coupling as shown in FIG. 2.

Referring again to FIG. 1, the coupling retainer assembly also includes a rigid ring 48 whose inner diameter is more or less the same as the outer diameter of the two retainer halves 38 when they encircle the end fittings. A pair of circumferential grooves 52 are formed in the inside surface of ring 48 near the opposite ends of the ring. These grooves accommodate a pair of circular spring wires 54. The depth of each groove 52 is slightly greater than the cross-sectional diameter of the spring wire 54. Moreover, the inner diameter of the spring wire is less than the inner diameter of the ring 48 so that when the spring wire is inserted into the groove and is unstressed, it extends radially inward beyond the inner surface of the ring. When the ring is slid over the joined retainer halves, the spring wires retract into their respective grooves. However, when the ring 48 is centered axially on the retainer halves, the wires 54 snap into a pair of spaced apart circumferential grooves 56 formed in the outside surfaces of the retainer halves. Thus the wires prevent the ring 48 from being inadvertently dislodged from the retainer halves in the event the coupling is bumped or jostled. The ring may be made even more bump and jostle resistant by forming spaced-apart bends in the wire 54 that make it operate as three or four short, stiffer sections, rather than as a single full length spring wire.

To install the present coupling, the ferrules 18 of coupling sections 14 and 16 are first secured to the ends of tubing 10 and 12 respectively. Then the two coupling sections are brought flush together in axial alignment with an O-ring 34 situated in the end fitting grooves 32 as shown in FIG. 2. Next, the retainer halves 38 are arranged around the coupling sections with their ends in register so that the tapered grooves 42 in the retainer halves receive the tapered end fitting flanges 30. The opposite ends of the retainer halves may be provided with mating tongues and grooves (not shown) to facilitate the axial alignment of the retainer halves using only one hand. This is desirable when it is necessary to connect the tubing sections together in a confined space such as inside an aircraft wing.

With the two retainer halves pressed together so that their ends are flush against one another, the rigid ring 48 which had previously been slid onto one tubing section, say tubing section 12, is slid back over the retainer halves so that it completely encircles and captures them. When the ring is centered on the retainer halves, the spring wires 54 snap into the grooves 46 formed in the outside surface of the retainer halves thereby maintaining the ring in its axially centered position. It should be emphasized at this point that the spring wires 54 simply serve to maintain the axial position of the ring 48. They are not subjected to any stresses due to bending, twisting, extension or compression loads on the coupling. Furthermore, even if the ring 48 should be displaced axially somewhat on the retainer halves, one spring wire will still remain between the two retainer grooves 56 to prevent the ring from sliding completely off the retainer halves axially in either direction.

When the ring 48 encircles the retainer halves 38 as depicted in FIG. 2, the retainer halves are wedged against the tapered flanges 30 on the coupling end fittings. This wedging action axially compresses the end fittings thereby squeezing the O-ring 34 and providing a fluid-tight seal at that point which remains static even when the tubing 10 and 12 are bent or moved axially relative to one another. In other words, when the coupling is subjected to such relative motion, the end fittings 28 thereof remain stationary as does the O-ring 34 sandwiched between them. Due to the considerable flexibility afforded by the bellows 26, the tubing 10 can be angularly misaligned to a considerable extent with respect to tubing 12. However, to limit the axial extension and deflection of the coupling sections 14 and 16 and thereby minimize excessive stresses on the two bellows 26, the ferrule flange 22 is arranged to engage the spherical surfaces 46a and 46b at the insides of the retainer halves if the extension and deflection proceeds beyond selected limits. Thus when an axial load is applied to the coupling tending to extend it excessively, the stress on the coupling is distributed all around the ferrule flanges and retainer halves. Furthermore, when the tubing sections 10 and 12 are angularly misaligned, the spherical curvature of the retainer half surfaces 46a and 46b assure that continuous contact between each rounded ferrule rim 22a and surfaces 46a and 46b is maintained all around the coupling so that uniform support is provided all around the ferrules and stresses remain distributed and are not concentrated at a few points of contact between those components of the coupling.

If electrical bonding between the tubing sections 10 and 12 is desired, a good electrical connection between the coupling sections 14 and 16 where they join at the end fitting surfaces 28b can be assured by applying an electrically conductive coatings 60 (FIG. 2) to the walls of grooves 42 in the retainer halves.

In some applications, particularly where very high temperatures are involved, it is not desirable to use an elastomeric O-ring type seal. FIGS. 3A to 3E disclose several coupling end fitting configurations that form static fluid-tight seals when compressed together by the wedging action of the retainer halves as described above. All of these seals operate effectively at elevated temperatures as high as 1000° to 1200° F.

Figure 3A:
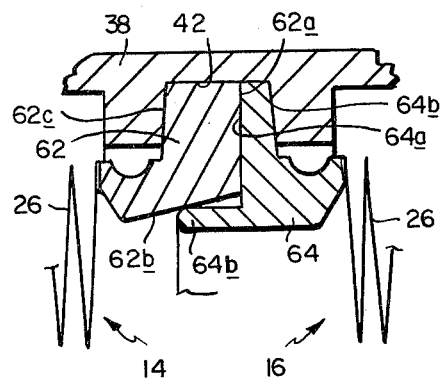
FIGS. 3A to 3E are fragmentary sectional views on a larger scale illustrating different coupling embodiments.

In FIG. 3A, the coupling sections 14 and 16 include end fittings 62 and 64 respectively whose proximate faces 62a and 64a are arranged to fit flush together as shown in that figure. Fitting 62 is provided with an inner frustoconical surface 62b contiguous with face 62a, while fitting 64 is provided with a thin, laterally extending circular rib or skirt 64b which projects toward surface 62b. Both end fittings include distal tapered sidewalls 62c and 64c respectively as described above in connection with FIG. 2.

When the two fittings are compressed together by the wedging action of the grooves 42 in the encircling retainer halves 38, the two fittings are compressed axially so that faces 62a and 64a are flush against one another. At the same time, the lip of the skirt 64b is pressed tightly against the inclined surface 62b to the extent that the skirt lip is slightly deflected to provide a high sealing load all around the coupling as the two end fittings are compressed together.

Figure 3C:
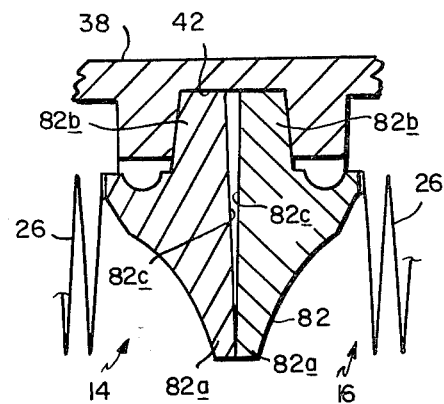
Figure 3B:
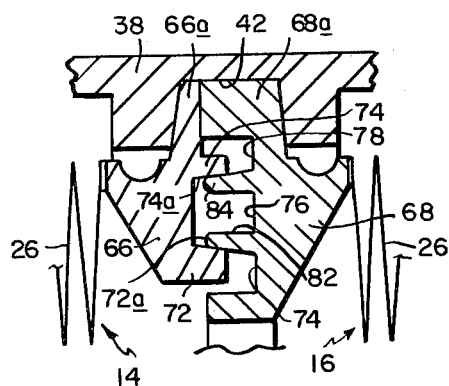

FIG. 3B illustrates a coupling employing end fittings 66 and 68 having flanges 66a and 68a with tapered sidewalls that are arranged to wedge into the grooves 42 in retainer halves 38. Fitting 66 is formed with a pair of relatively rigid, radially spaced apart circular ribs 72 and 74 that project toward end fitting 68. Furthermore the rib walls 72a and 74a facing one another are tapered in a divergent fashion. End fitting 68, on the other hand, has three relatively deep radially spaced circular grooves 74, 76 and 78 formed in its face opposite fittings 66. The grooves are relatively wide and they are positioned so as to leave relatively thin tapered circular ribs or lands 82 and 84 located directly opposite the tapered rib walls 72a and 74a on end fitting 66. Thus when the two end fittings are compressed axially together by the wedging action of the retainer halves 38, the lands 82 and 84 are wedged against the tapered walls 72a and 74a respectively to provide high sealing loads at those two radially spaced lines all around the coupling. Furthermore the cooperating annular sealing surfaces on the lands and ribs are located on the sides of those elements. Consequently, those sealing surfaces, which desirably have smooth finishes, are shrouded by the ends of the ribs and lands and protected from possible damage.

The coupling embodiments depicted in FIGS. 3A and 3B are disadvantaged somewhat in that the two retainer halves are not identical. FIG. 3C illustrates a coupling embodiment which avoids that disadvantage. That coupling employs two identical end fittings 82 each formed with a radially inwardly extending tapered annular nose 82a. The end fittings also include the customary flanges 82b having tapered sidewalls arranged to wedge into the grooves 42 in retainer halves 38. The surfaces 82c of the two end fittings which oppose one another when the end fittings are axially aligned are flat. However they are formed with slight tapers which diverge in the radially outward direction. In other words, they are slightly frustoconical relative to the coupling axis. Consequently when the end fittings are axially compressed by the wedging action of the retainer halves, the two end fitting noses 82a are forced tightly together so that the surfaces of the noses in contact are highly loaded at the inner diameters of the end fittings ensuring a reliable fluid-tight seal.

Figure 3D:
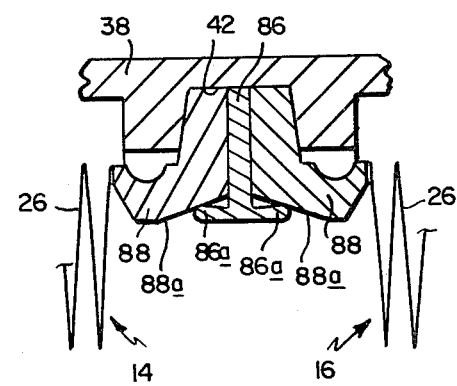

FIG. 3D shows a coupling embodiment employing a flexible annular metal seal 86. Seal 86 is captured between identical end fittings 88 in the coupling sections 12 and 14. The radially inner surfaces 88a of end fittings 88 are tapered so as to diverge axially as shown. Also, the seal 86 is provided with a pair of circular flanges 86a at its inner edge. These flanges project laterally from opposite sides of seal 86 and engage the tapered end fitting surfaces 88a. Thus when the two end fittings are compressed axially by the wedging action of the retainer halves 38, the end fitting surfaces 88a are wedged against the flanges 86a deflecting them slightly and thereby providing high sealing loads at the lines of engagement of the flanges and fitting surfaces. The FIG. 3D coupling embodiment is advantaged in that a visual check determines if the seal 86 is in place. If the seal is missing, the retainer halves 38 will not wedge the end fittings 88 together because of the clearance between the end fittings thereby giving an obvious indication that the coupling is not complete.

Figure 3E:
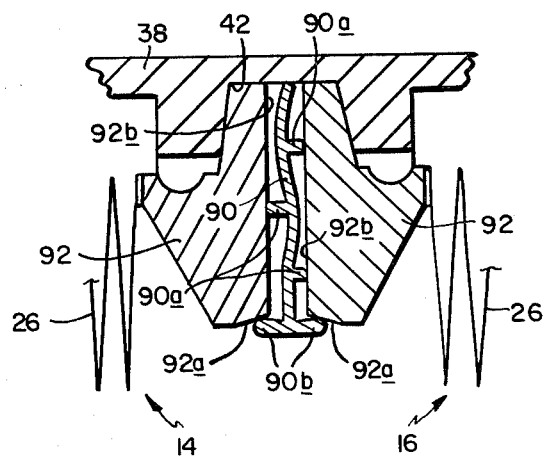

The coupling embodiment illustrated in FIG. 3E is a variation of the one just described in that it employs a metal seal 90 that is compressed between identical retainer halves 92 in the coupling sections 14 and 16. Seal 90 is an annular metal seal which is relatively thin so that it is somewhat flexible. The seal is formed with relatively thin short circular flanges 90a which project out from opposite sides of the seal at radially spaced-apart locations. Also at the radially inner edge of the seal are formed a pair of relatively thin annular flanges 90b which project out on opposite sides of the seal.

The radially inner edges of end fittings 92 are formed with frustoconical surfaces 92a which diverge as illustrated in FIG. 3E. When the two end fittings 92 are axially compressed by the wedging action of the retainer halves 38, the seal flanges 90b are deflected slightly by the wedging action of the fitting surfaces 92a providing relatively high sealing loads at those annular lines of contact. Furthermore, the end fittings press against the annular ribs 90a causing the seal itself to deflect in opposite directions as shown in FIG. 3E so that the seal resiliently biases the flanges 90a against the opposing surfaces 92b of the retainer halves. The deflection of the seal 90 is somewhat exaggerated in FIG. 3E for purposes of clarity. Like the coupling embodiment in FIG. 3D, if the seal 90 is missing, the retainer halves 38 will not wedge the end fittings 92 together giving an obvious indication that coupling is incomplete.

It is apparent from the foregoing that the flexible tubing coupling constructions described above provide reliable, highly effective, fluid-tight seals between joined tubing even under extreme pressure and temperature conditions. The seal components of the couplings are all static seals which are not subjected to stresses when the coupling is placed under load. On the other hand, the bellows components of the coupling give the device its unusual flexibility permitting substantial angular misalignment between the joined tubing sections. Yet the ferrules and retainer halves cooperate to prevent undue stresses on the bellows and to prevent the build up of stress concentrations in the event that excessive axial and deflection loads are imposed on the coupling. Finally, most of the coupling embodiments are composed of a relatively few number of different parts which are easily assembled in the field, and none of which are small detail parts that require especially high tolerances to maintain the integrity of the coupling.

It will thus be seen that the objects set forth above, among those made apparent from the preceding description are efficiently attained and, since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

I claim:

1. In a flexible tubing coupling for joining first and second tubing ends while permitting relative motion between said ends, the combination of
   A. first and second flanged ferrules for positioning at the respective tubing ends,
   B. first and second metal bellows secured at one of their ends respectively to said first and second ferrules,
   C. first and second end fittings secured to the respective opposite ends of said bellows, said first and second end fittings having opposing faces which when compressed axially coact to comprise a static fluid-tight seal, and
   D. a retainer assembly comprising
      1. a pair of identical semicircular retainer halves aligned together end to end to form a ring encircling said end fittings and ferrule flanges, said retainer halves and end fittings having opposing surfaces which wedge together so as to axially compress the end fittings when the retainer halves encircle the end fittings, and
      2. a rigid ring for snugly encircling and capturing the retainer halves so as to maintain them in encircling engagement on said end fittings.

2. The coupling defined in claim 1 and further including means for removably retaining the ring against axial displacement relative to the retainer halves.

3. The coupling defined in claim 2 wherein the retaining means comprises
   A. at least one continuous circumferential groove formed in the outside surfaces of the retainer halves when they are aligned,
   B. at least one circumferential groove formed in the inside surface of said ring, and
   C. at least one circular spring wire seated in one of said grooves and when relaxed having a sector projecting out of said one groove, said spring wire resiliently engaging in another of said grooves when the ring is axially positioned correctly on the retainer halves.

4. The coupling defined in claim 3 wherein there are two sets of retainer half grooves, ring grooves and seated spring wires at axially spaced locations on the retainer halves and ring.

5. The coupling defined in claim 1 and further including coacting surfaces on said ferrules and said retainer halves for limiting relative axial and deflection movements of said ferrules.

6. The coupling defined in claim 5 wherein said limiting means comprises a radial rim on each ferrule and an annular inner surface on each retainer half disposed radially outward of the corresponding ferrule rim, each said surface having a spherical cross section so that when said ferrules are cocked or extended axially relative to the retainer halves, said rims remain in engagement with said spherical surfaces all around the coupling.

7. The coupling defined in claim 1 wherein said opposing wedging together surfaces comprise
   A. a radial flange on each end fitting, the distal side walls of said flanges being tapered so that when the two end fittings are placed together in axial alignment, said two flanges form an annular wedge, and
   B. a wedge-shaped semicircular groove formed in each retainer half intermediate its side edges so that when the two retainer halves encircle the end fittings, the side walls of said grooves wedge against the end fitting flanges so as to axially compress the end fittings.

8. The coupling defined in claim 1
   A. wherein said opposing faces of the end fittings are formed with circular grooves which when placed together in register form an annular O-ring gland, and
   B. further including an O-ring seated in said gland.

9. The coupling defined in claim 1 wherein said opposing faces of said end fittings are formed with circular resilient ribs which interfit and resiliently engage one another when the end fittings are compressed axially so as to provide high sealing loads along the circular lines of resilient engagement between said end fitting ribs.

10. The coupling defined in claim 1 wherein
    A. said opposing face of said first end fitting is formed with a laterally extending circular rib which projects laterally toward said second end fitting, and
    B. said opposing face of said second end fitting is formed with a frustoconical surface opposite said ribs so that when the two fittings are compressed axially by the wedging engagement of the retainer halves, the rib resiliently engages said surface so as to provide a high sealing load along their circular line of resilient engagement.

11. The coupling defined in claim 1 wherein said opposing faces of said end fittings are formed with radially inwardly tapering resilient noses so that when the first and second end fittings are compressed axially by the wedging action of the retainer halves, the noses resiliently engage one another to provide a high sealing load along their circular line of engagement.

12. The coupling defined in claim 1
    A. wherein said opposing surfaces are formed with frustoconical surface portions, and
    B. further including an annular seal positioned between said end fittings, said seal having one or more radially spaced circular ribs projecting toward said frustoconical surface portions so that when said end fittings are compressed axially by the wedging engagement of the retainer halves, said ribs resiliently engage said surface portions to provide high sealing loads along their lines of resilient engagement.

13. The coupling defined in claim 12 wherein said annular seal is resilient and formed with laterally extending circular ribs at radially spaced-apart locations on opposite sides of said seal so that when the end fittings are compressed axially by the wedging engagement of the retainer halves, said radially spaced-apart ribs are engaged by opposing surfaces of the end fittings so as to axially deflect said seal at radially spaced-apart locations so that said seal biases said radially spaced-apart ribs against said opposing surfaces of said end fittings thereby providing high sealing loads along their circular lines of engagement.

* * * * *